No. 887,649. PATENTED MAY 12, 1908.
J. KENNEDY.
WHEEL.
APPLICATION FILED NOV. 30, 1906.

WITNESSES
R A Balderson
W W Swartz

INVENTOR
Julian Kennedy
by Bakewell & Byrnes
his attys.

UNITED STATES PATENT OFFICE.

JULIAN KENNEDY, OF PITTSBURG, PENNSYLVANIA.

WHEEL.

No. 887,649.                Specification of Letters Patent.          Patented May 12, 1908.

Application filed November 30, 1906. Serial No. 345,585.

*To all whom it may concern:*

Be it known that I, JULIAN KENNEDY, of Pittsburg, Allegheny county, Pennsylvania, have invented a new and useful Wheel, of which the following is a full, clear, and exact description, reference being had to the accompanying drawings, forming part of this specification, in which—

Figure 1:
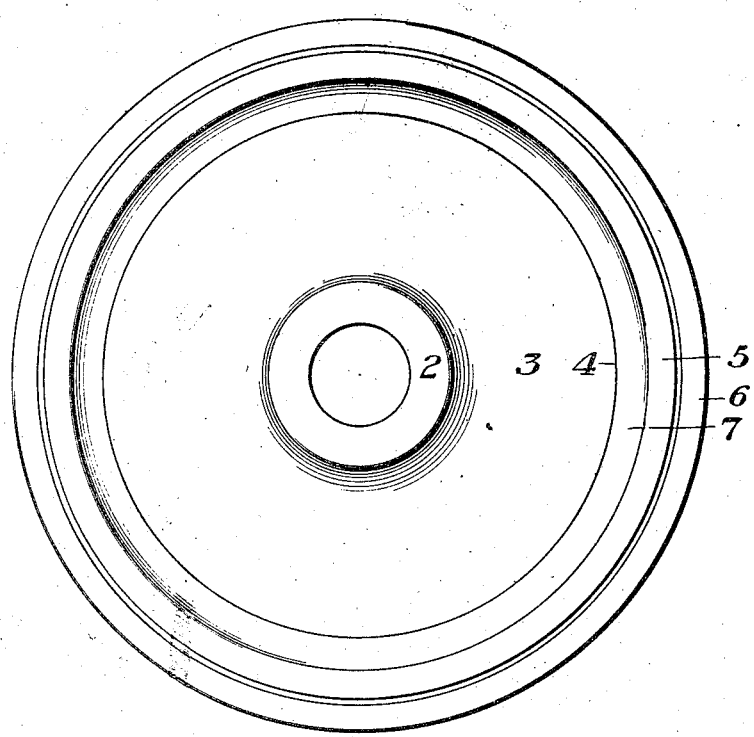
Figure 2:
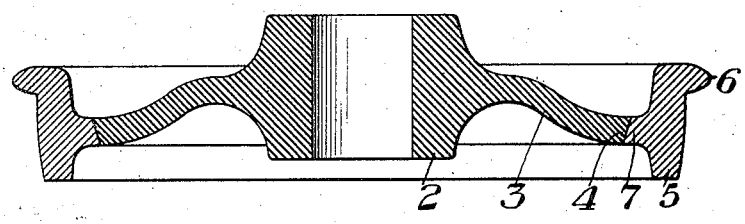

Figure 1 is a top plan view showing a car wheel constructed in accordance with my invention; and Fig. 2 is a central cross-section of the same.

My invention relates to the manufacture of wheels, and particularly car wheels for railway rolling stock. Heretofore it has been proposed to make all-steel car wheels by certain pressing, rolling and shaping operations in which a wheel is produced having the rim or tire integral with the web and hub. It is also of course old to form the tires separately and bolt or otherwise mechanically secure them to the rim of a locomotive wheel.

My invention is designed to provide a steel car wheel which may be more cheaply made than the ordinary all-steel car wheel, and which shall also have a better quality of metal in the tread and flange portions.

In carrying out my invention I form the hub and web of the wheel of steel or wrought metal either by casting, pressing, shaping, or in any other desirable manner. I form the tread and flange portions of the wheel as a separate operation, such portions being preferably provided with an inwardly-extending annular rib or flange. I then electrically weld the rib portion of the tire or rim to the web portion of the body, thus forming a wheel which may be cheaply made, while very durable and strong.

In the drawings, 2 represents the hub and 3 the continuous web of a steel wheel, these parts being formed by casting or in any other desirable way. The outer edge portion 4 of the web is preferably machined to give a smooth surface and preferably extends at an angle to the axis of the hub or to the general plane of the wheel.

5 is the rim portion having the usual tread and the flange 6, and being provided with an inwardly-projecting annular rib 7. This tire or rim portion with its rib or inwardly-projecting flange may be formed by the ordinary methods for rolling tires, such as used in making tires for locomotive wheels. The inner edge portion of the tread rib or flange is then preferably machined at an angle corresponding to the edge angle of the web, and the parts may then be fitted together and electrically welded by the use of well-known methods. The welding may be carried out through the entire circumference of the joint at one operation, or the welding may be carried out successively in successive sections. During the welding operation, the joint may be firmly pressed together, and the bevel of the surfaces enables them to be brought into intimate contact.

The advantages of my invention result from the separate formation of the rim or tire and the body portion proper, and the electrical welding of these parts. In this way the tire or rim may be rolled or otherwise treated so as to give the characteristics desirable in regard to wear, shocks, etc.; while the body portion may be formed of another character of steel or treated in such way as to give the characteristics desired for the hub and body. The wheel when completed is an all-steel wheel without any bolted or riveted joints, thus giving a strong, long-lived wheel having the desired characteristics of metal in the different portions thereof.

The wheel may be provided with spokes in which case the rib of the rim may be continuous or interrupted. The shape and size of the parts may be varied, and many other variations may be made in the wheel and the steps of its formation, without departing from the spirit and scope of my invention.

I claim:—

1. As a new article of manufacture, a wheel composed of a center portion and a rim portion, the two portions being separately and independently formed and united by an electrical weld extending between and throughout the directly contacting surfaces thereof; substantially as described.

2. As a new article of manufacture, a railway wheel composed of a continuous center portion, and a continuous rim or tread portion, the two portions being separately and independently formed, and united by an electrical weld between contacting surfaces; substantially as described.

3. As a new article of manufacture, a wheel having a rim or tire portion with an inwardly-projecting rib or flange welded to the body of the wheel; substantially as described.

4. As a new article of manufacture, a wheel having a rim or tire portion with an inwardly-projecting rib or flange welded to the body of the wheel, the joint being on an incline or bevel relative to the general plane of the wheel; substantially as described.

5. As a new article of manufacture, a railway wheel having a rolled flange and tread portion with an inwardly-projecting rib, and a wheel body electrically welded to said rib, the joint extending on a bevel or incline; substantially as described.

6. As a new article of manufacture, a wheel having a body or center portion, and a rim portion electrically welded thereto, the welded joint between the two portions extending on a level or incline; substantially as described.

7. As a new article of manufacture, a wheel composed of a steel center portion and a steel tire, the two being secured together by an electrically welded joint between plane, directly-contacting, surfaces thereof; substantially as described.

In testimony whereof, I have hereunto set my hand.

JULIAN KENNEDY.

Witnesses:
H. W. RANO,
A. McB. REX.